Aug. 13, 1935. C. D. PETERSON 2,011,501
CHANGE SPEED TRANSMISSION MECHANISM (SHIFTING MECHANISM FOR ADDITIONAL GEAR RATIO)
Filed March 16, 1932 4 Sheets-Sheet 1
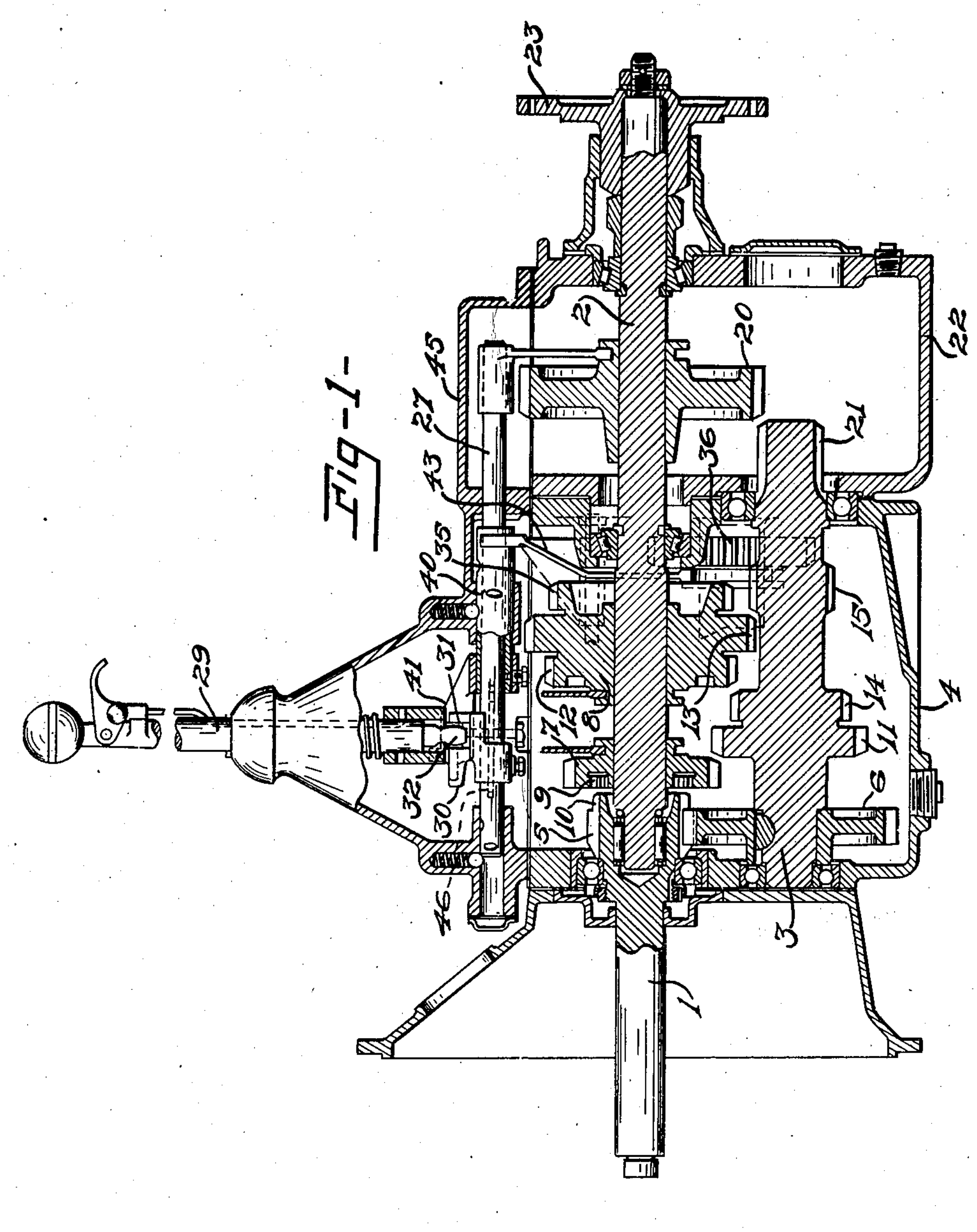
Fig-1-
INVENTOR.
Carl D. Peterson
BY Bodell + Thompson
ATTORNEYS.

Aug. 13, 1935. C. D. PETERSON 2,011,501
CHANGE SPEED TRANSMISSION MECHANISM (SHIFTING MECHANISM FOR ADDITIONAL GEAR RATIO)
Filed March 16, 1932 4 Sheets-Sheet 2
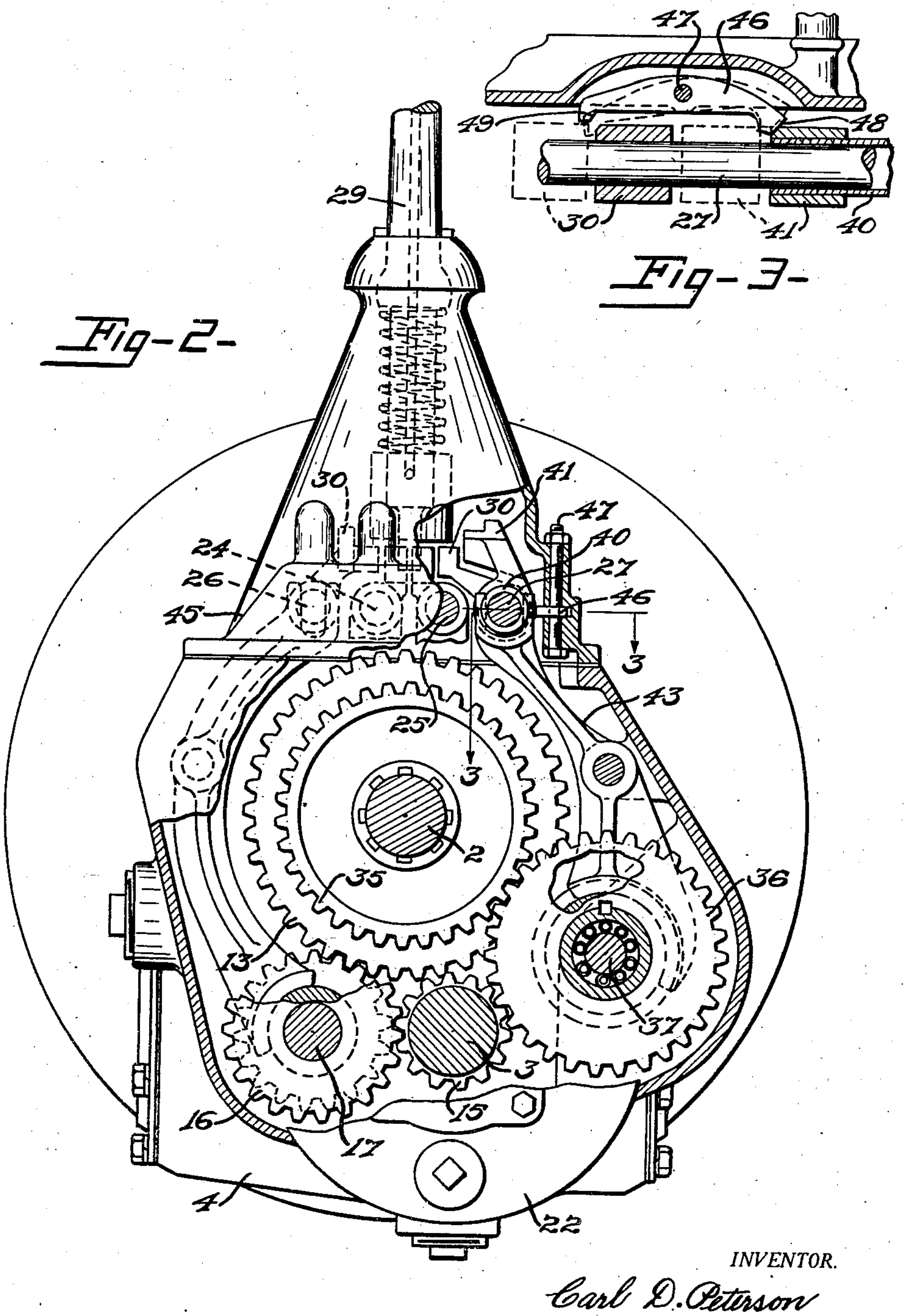
Fig-2- Fig-3-
INVENTOR.
Carl D. Peterson
BY
Bodell & Thompson
ATTORNEYS.

Aug. 13, 1935. C. D. PETERSON 2,011,501
CHANGE SPEED TRANSMISSION MECHANISM (SHIFTING MECHANISM FOR ADDITIONAL GEAR RATIO)
Filed March 16, 1932 4 Sheets-Sheet 3
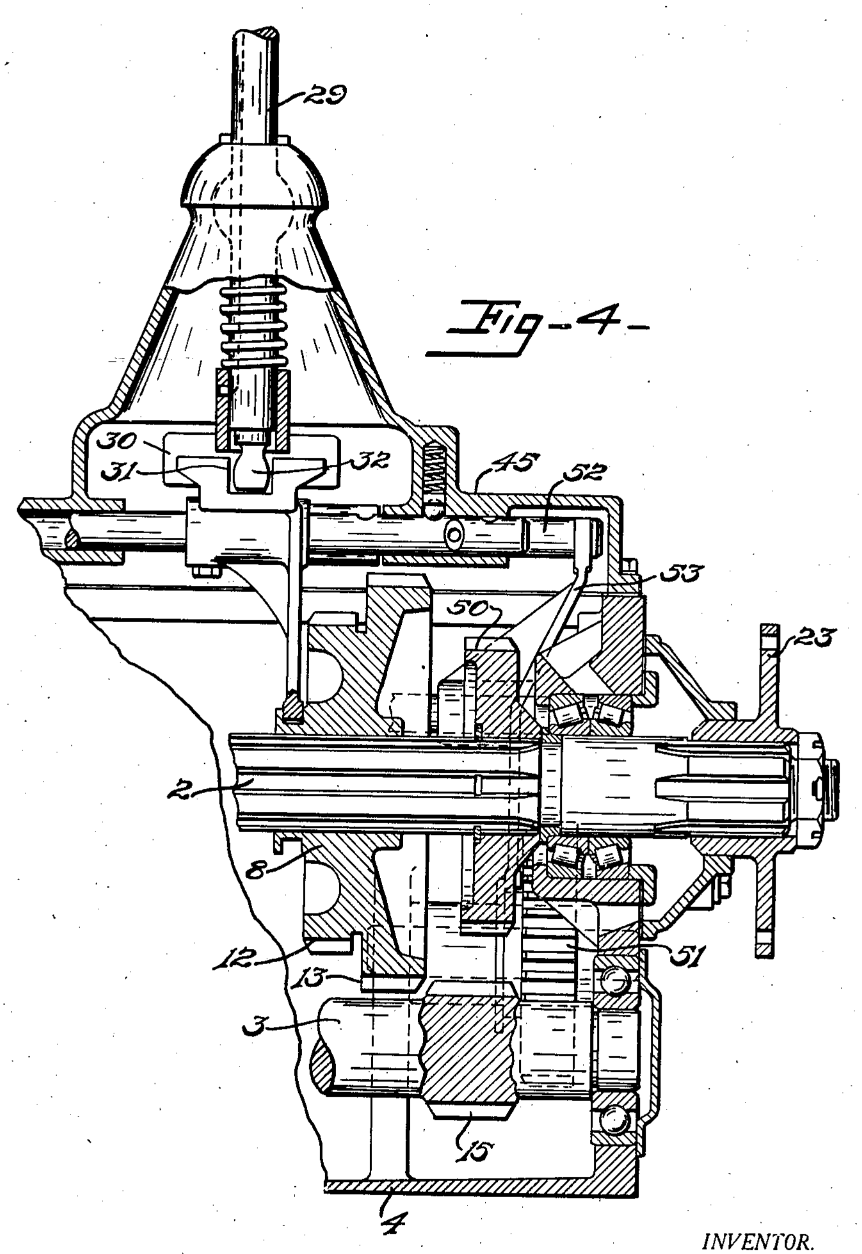
Fig-4-
INVENTOR.
Carl D. Peterson
BY
Bodell & Thompson
ATTORNEYS.

Aug. 13, 1935. C. D. PETERSON 2,011,501
CHANGE SPEED TRANSMISSION MECHANISM (SHIFTING MECHANISM FOR ADDITIONAL GEAR RATIO)
Filed March 16, 1932 4 Sheets-Sheet 4
Fig-5-
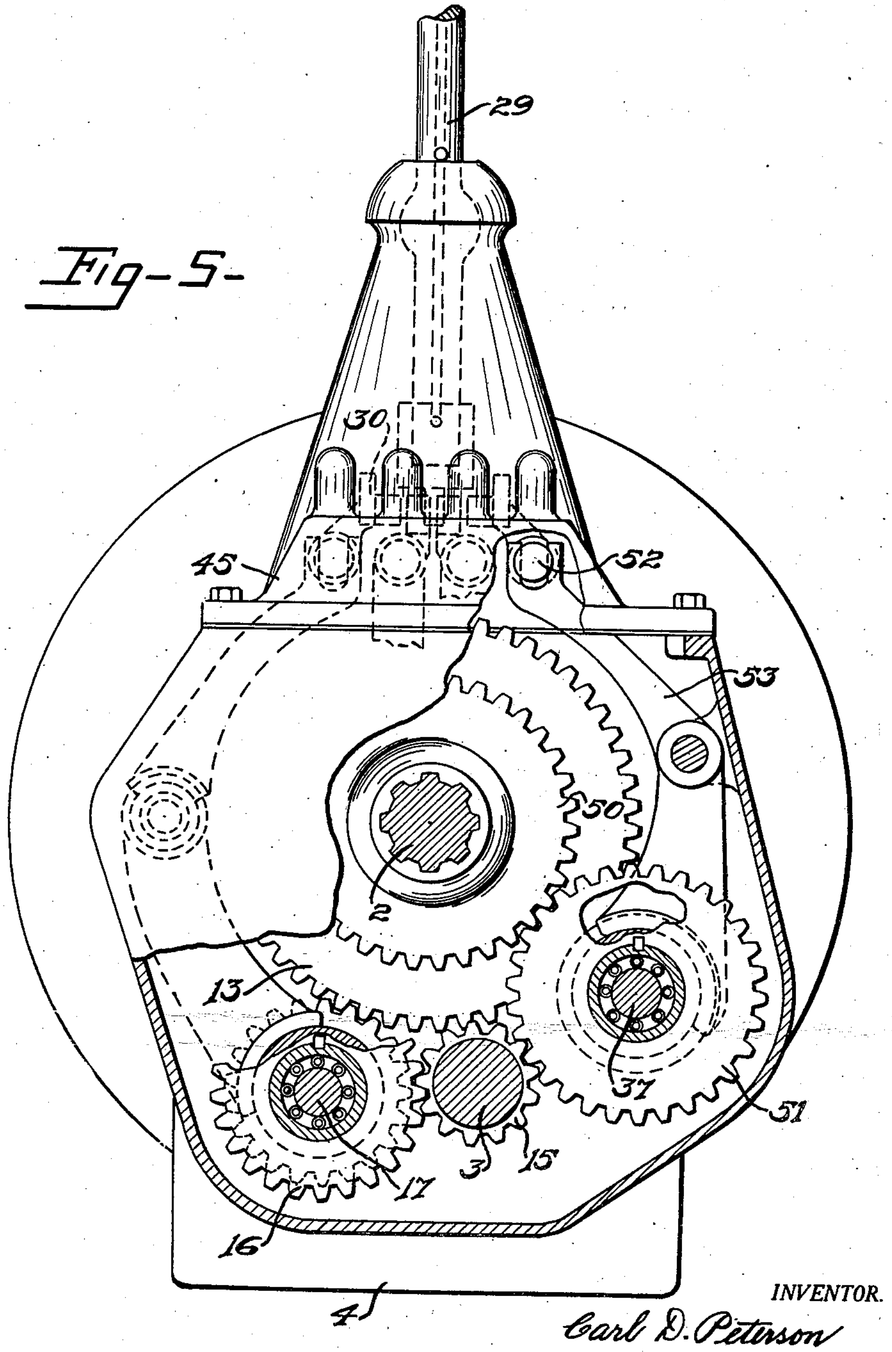
INVENTOR.
Carl D. Peterson
BY
Bodell & Thompson
ATTORNEYS Patented Aug. 13, 1935 2,011,501

UNITED STATES PATENT OFFICE 2,011,501

CHANGE SPEED TRANSMISSION MECHANISM (SHIFTING MECHANISM FOR ADDITIONAL GEAR RATIO)

Carl D. Peterson, Toledo, Ohio, assignor to Spicer Manufacturing Corporation, Toledo, Ohio, a corporation of Virginia Application March 16, 1932, Serial No. 599,229

1 Claim. (Cl. 74—473)

This invention relates to selective change speed transmission gearing having shiftable elements and of the type used in motor vehicles, and has for its object, a particularly simple and efficient arrangement of an additional gear change, as an additional reverse gear and shifting mechanism therefor correlated with the regular selecting and shifting mechanism, so that additional shift rods are not necessary.

The invention consists in the novel features and in the combinations and constructions hereinafter set forth and claimed.

In describing this invention, reference is had to the accompanying drawings in which like characters designate corresponding parts in all the views.

Figure 1 is a longitudinal, sectional view of one form of gearing embodying this invention.

Figure 2 is an end view illustrating the arrangement of the reverse gearing, and the shifting mechanism therefor.

Figure 3 is a fragmentary detail view on line 3—3, Figure 2 showing the reverse gearing locking device.

Figure 4 is a fragmentary sectional view, similar to Figure 1, of a modified arrangement of gearing embodying this invention.

Figure 5 is a fragmentary end view of parts seen in Figure 4.

This change speed gearing includes generally, the usual drive, transmission and countershafts mounted in the usual gear box, gearing between said shafts including shiftable elements to produce the regular forward speeds, and reverse, and shifting mechanism, including the usual shift rods, and a selecting and gear shifting lever coacting therewith, additional gearing between the countershaft and the transmission shaft including an idler, and an additional gear on the transmission shaft, one of these additional gears being shiftable into and out of mesh with the other, and being normally out of mesh therewith and shifting mechanism for said shiftable gear. The shifting mechanism may include a sleeve slidable axially of one of the regular gear shift rods, and connected to the shiftable gear, and having means for coacting with the selecting and shifting lever.

In Figure 1, 1, 2, and 3, designate respectively, the drive, transmission, and countershafts of a standard sliding gear transmission gearing, these being suitably mounted in a gear box 4. The shaft 1 is connected to the engine of the vehicle, in which the gearing is installed, through the usual clutch, not shown, one element of which is mounted on the shaft 1. The gearing between these shafts comprises intermeshing gears 5 and 6 mounted respectively on the drive shaft 1, and the counter shaft 3, sliding gears 7 and 8 mounted on the transmission shaft and shiftable into and out of mesh with gears on the countershaft. The gear 7 has a clutch face 9 for coacting with a complemental clutch face 10 on the gear 5. The gear 7 is shiftable to the left from neutral, Figure 1, to engage the clutch faces to produce high or fourth speed, and to the right from neutral into mesh with the gear 11 on the countershaft to produce third speed forward. The gear 8 is a double gear including gears 12 and 13, and is shiftable to the left from neutral to engage the gear 12 with the gear 14 on the countershaft to produce second speed forward and to the right from neutral to engage the gear 13 with the gear 15 on the countershaft to produce first or low speed forward.

To produce reverse, an idler 16, which is composed of a double gear mounted on a stud 17 on the rear wall of the gear box 4, is shiftable into mesh with the gear 13, and the gear 15 when the gear element 8 is in neutral position. Thus, the gears within the main gear box are operable in the usual manner to produce four forward speeds, and one reverse.

In Figure 1, an additional, or emergency, low speed is provided consisting of a slidable gear 20 on the transmission shaft, and normally out of mesh with a gear 21 on the countershaft and shiftable into mesh therewith. The gear 20 is mounted in an auxiliary gear box 22 which is detachably secured, as by screws or bolts not shown, to the rear wall of the main gear box 4, and the transmission shaft extends through the auxiliary gear box 22 and is provided with means, as a universal joint, for connection to the propeller shaft of the vehicle. 23 designates a section of the universal joint.

The countershaft 3 also extends at its rear end into the auxiliary gear box, and the gear 21 is cut on the rear end thereof.

The gears 7, 8 and 20, and idler 16 are shifted in the usual manner by gear shifting mechanism including rods 24, 25, 26, and 27, which are connected by forks to the gears 7, 8, 16, and 20, respectively, and a selecting and gear shifting lever 29 for coacting with the rods in the usual manner, that is, each rod is provided with a block, as 30, having a notch 31 therein, the notches being arranged in transverse alinement when the rods are in neutral position, in order that the finger 32 at the lower end of the gear shifting lever may coact therewith. The shifter rods are held from movement by the shifting fork any one rod by the usual locking mechanism.

The additional reverse is provided by an additional gear on the transmission shaft and additional idler between the countershaft and the additional gear on the transmission shaft, the additional gears being normally out of mesh, and one of them being shiftable into and out of mesh with the other.

In the gearing shown in Figure 3, 35 designates the additional gear on the transmission shaft, this being shown as formed as a unit with the gear element thereon.

36 designates the additional idler, this being mounted on a stud shaft 37 in the gear housing alongside the transmission shaft, and the additional idler is shiftable axially into mesh with the gear 15 on the countershaft, and the gear 35 to produce another reverse gear ratio between the countershaft and the transmission shaft.

The shifting mechanism for this additional idler is incorporated with the regular gear shifting mechanism so that additional shift rods are unnecessary, and as here illustrated, the idler 36 is shifted by means of a sleeve 40 slidably mounted on one of the shift rods 20, 21, 22, or 23, and is provided with a block 41 having a notch for coacting with the finger 32 of the shifting lever 29 in the same manner that the finger coacts with the notches 31 of the block 30. The sleeve is provided with a fork 43 coacting with the additional idler 36 to slide it on its shaft.

In the illustrated embodiment of my invention, the sleeve is mounted on the emergency low speed rod 23 so that the two added gear changes are grouped together, that is, the emergency low, and the additional, or emergency, reverse. The shift forks are slidably mounted on the rod 45 of the gear box in the usual manner.

The sleeve is prevented from shifting with the shift rod 23 and the rod 23 relieved of the necessity of shifting when the sleeve is being shifted by suitable locking means, here shown as a member supported by the rod 23 and the sleeve 40 when being shifted to block the other against shifting. This member is a lever 46 pivoted at 47 to the cover and arranged to extend lengthwise of the rod 23 and to each side thereof with the block 41 of the sleeve 40 and adjacent the block 30 on the rod 23. The ends of the lever are provided with rounded shoulders 48, 49 for coacting respectively with complemental faces on the blocks 41 of the sleeve 40 and block 30 of the rod 23. When the sleeve is shifted on the rod, the lever 46 is rocked to engage the shoulder 49 with the block 30 and hold it from shifting, and when the rod 23 is shifted the lever shifts to engage the shoulder 48 with the block 41.

In Figure 4, the additional gear 35 corresponding to the gear 35 instead of being integral with the shiftable gear element, is an additional gear fixed on the counter of the transmission shaft and the gear 50, and the idler 51 is shiftable into and out of mesh therewith.

In the gearing shown in Figures 4 and 5, there is one emergency low and one emergency low speed shift rod, and additional reverse is effected, that is, the idler 51 is shifted by a shift rod 52 connected thereto by a fork 53.

In Figure 6, the regular transmission of four speeds and reverse are effected substantially as in Figure 2. In as many conventional selective sliding gear change speed gearings. A shift rod 52 is selected and shifted by the gear shifting lever the same as any other rod, and the rod 52 shifts the idler 51 into and out of mesh with an additional gear 55 on the transmission shaft, which additional gear is not combined with the double gear 8 as in Figure 4.

What I claim is:

A gear shifting mechanism for change speed transmission gearing including a manually movable shift fork, a sleeve slidable on the rod, the rod and the sleeve being connected to different shiftable elements of the gearing and a selecting and shifting lever having a finger coacting with the sleeve and the rod to shift the either axially relatively to the other, the rod having a block formed with a notch for receiving the finger of the shifting lever and the sleeve having a block formed with a similar notch with which the finger engages when the rod and the sleeve are in neutral position, and means operated by the shifting movement of the sleeve for holding the rod from shifting when the sleeve is shifted and operated by the rod for holding the sleeve when the rod is shifted.

CARL D. PETERSON.